3,116,026
DIRIGIBLE LAMP ASSEMBLY FOR VEHICLES
Chait Ram Gupta, New Delhi, India, assignor to Council of Scientific and Industrial Research, New Delhi, India, a corporation of India
Filed Dec. 31, 1958, Ser. No. 784,138
6 Claims. (Cl. 240—61.7)

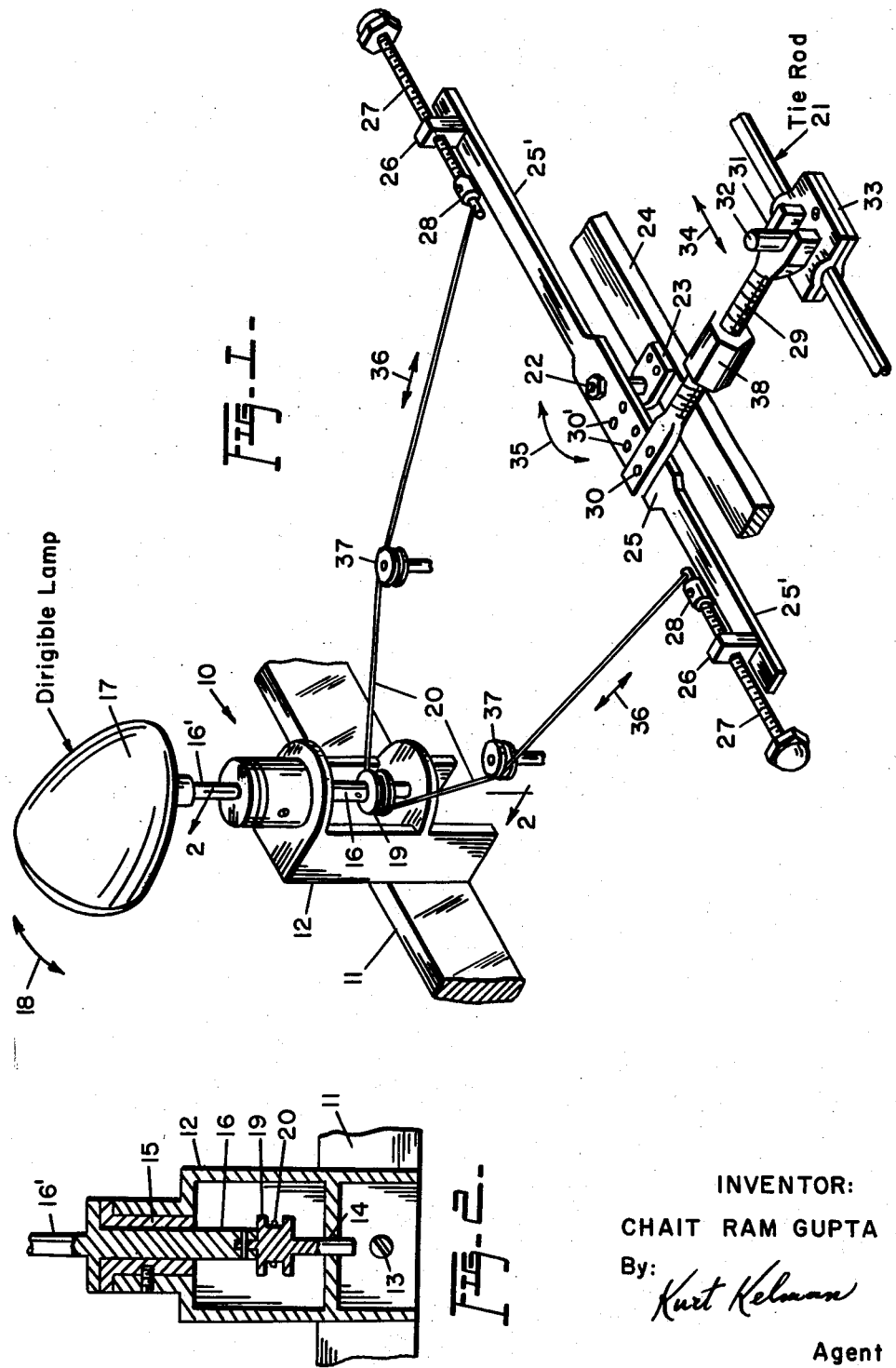

This invention relates to new and useful improvements in vehicle lamps used for illuminating the road, and the principal object of the invention is to facilitate illumination of the road at curves, turns or corners which the vehicle is about to negotiate.

This object is attained by the provision of a dirigible lamp assembly which, rather than being fixedly secured to the vehicle in a straight-ahead orientation, is pivotally mounted so that it may be swung from side to side.

Another object of the invention is to provide means for automatically actuating the dirigible lamp in response to movement of a component of the steering mechanism of the vehicle, so that the lamp is swung from a straight-ahead position to one side or the other concurrently with steering of the vehicle wheels.

The dirigible lamp of the invention may be installed in any suitable location on the vehicle, either in substitution for or in addition to the conventional headlamps, an important feature of the invention residing in its arrangement which permits it to be installed without any extensive or expensive changes in the structure of the vehicle itself.

Other advantages of the invention reside in its simplicity of construction, in its durability, in its dependable operation, and in its adaptability to economical manufacture.

With the foregoing more important objects and features in view and such other objects as may become apparent as this specification proceeds, the invention will be understood from the following description taken in conjunction with the accompanying drawings, wherein like characters of reference are used to designate like parts, and wherein:

FIGURE 1 is a perspective view of the dirigible lamp assembly of the invention with its actuating means, fragments of the vehicle also being shown to illustrate mounting of the components of the invention; and FIGURE 2 is an enlarged vertical sectional detail, taken substantially in the plane of the line 2—2 in FIGURE 1.

Referring now to the accompanying drawings in detail, the dirigible lamp assembly of the invention is designated generally by the reference numeral 10 and may be mounted in any suitable location on the vehicle, as for example, on a bumper bar 11. For mounting the lamp assembly, a suitable bracket 12 is provided, which may be rigidly secured to the bar 11 as by one or more bolts or screws 13. The bracket 12 provides bearings 14, 15 for a rotatable, vertical shaft 16, an upward extension 16' of which carries a lamp unit 17, it being apparent from the foregoing that the lamp unit 17 may be oriented straight-ahead or swung from side to side as indicated at 18. The lower end portion of the shaft 16 is equipped with a pulley 19, around which passes the intermediate portion of a flexible cable 20 for imparting rotation to the shaft and consequently swinging the dirigible lamp, in response to movement of a component of the steering mechanism of the vehicle, as will be presently explained.

The component of the steering mechanism by which the dirigible lamp is actuated preferably is the tie rod, a portion of which is shown at 21. As is conventional the tie rod connects together two steerable wheels of the vehicle and is subjected to a reciprocating or translatory movement druing steering, which movement is utilized to actuate the cable 20 of the dirigible lamp. For this purpose, a pivot or fulcrum 22 is fixed, as by a bracket 23, to a suitable portion of the vehicle adjacent the tie rod 21, as for example, to a vehicle frame member 24. A lever 25 is swingably mounted on the pivot 22 and provides a pair of arms 25' at the opposite sides of the pivot, these arms carrying screw-threaded blocks 26 with adjusting screws 27 to which the ends of the cable 20 are connected, as by suitable couplings 28.

A link 29 is rigidly but adjustably secured to the lever 25 adjacent the pivot 22 and extends substantially at right angles from the lever, one end portion of the link 29 being equipped with bolts or screws 30 which are receivable selectively in groups of apertures 30' formed in the lever, whereby the link 29 may be secured to the lever at a selected distance from the pivot 22.

The other end of the link 29 is provided with a fork or yoke 31 which straddles an upstanding pin 32 supported by a suitable clamp 33 on the tie rod 21. It will be apparent that when the tie rod is subjected to a reciprocating or translatory movement during the steering operation, as indicated by the arrow 34, the link 29, rigidly secured by the means 30 to the lever 25, will cause the lever to swing as at 35 about the pivot 22, thus pulling the cable 20 as at 36 and rotating the shaft 16 to swing the lamp 17 accordingly. Suitable guide pulleys 37 may be provided to engage stretches of the cable 20 between the couplings 28 and the shaft 16, if necessary or desirable.

In order to assure proper engagement of the yoke or fork 31 with the pin 32, the link 29 is preferably made of two complemental, oppositely screw-threaded sections, connected together by a turnbuckle 38, so that the length of the link may be adjusted.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the appended claims.

What I claim is:

1. For use on a vehicle having a steering mechanism including a translatable tie-rod, a dirigible lamp assembly comprising in combination a mounting bracket adapted to be secured to said vehicle, a vertical shaft rotatably journalled in said mounting bracket, a lamp unit carried by said shaft, a fixed pivot adapted to be secured to said vehicle, a lever mounted intermediate the ends thereof on said pivot and providing a pair of arms at the opposite sides of the pivot, a link rigidly secured at one end thereof to said lever at a point adjacent said pivot and projecting laterally from the lever, means provided at the other end of said link for operatively connecting the same to said tie-rod whereby said lever may be oscillated on said pivot by translatory movement of the tie-rod, and a flexible cable having its ends secured to the respective arms of said lever, the intermediate portion of said cable passing around and operatively engaging said vertical shaft whereby said lamp unit may be swung in a horizontal plane by the oscillatory movement of said lever.

2. The device as defined in claim 1 together with a pulley secured to said vertical shaft, the intermediate portion of said cable passing around said pulley.

3. The device as defined in claim 1 together with screw-threadedly adjustable means connecting the ends of said cable to said arms.

4. The device as defined in claim 1 together with means for adjusting the point of attachment of said link to said lever toward and away from said fixed pivot.

5. For use on a vehicle having a steering mechanism including a translatable tie-rod, a dirigible lamp assembly mechanism including a translatable tie-rod, a dirigible lamp assembly comprising in combination a mounting bracket adapted to be secured to said vehicle, a vertical shaft rotatably journalled in said mounting bracket, a lamp unit carried by said shaft, a fixed pivot adapted to be secured to said vehicle, a lever mounted intermediate the ends thereof on said pivot and providing a pair of arms at the opposite sides of said pivot, a link rigidly secured at one end thereof to said lever at a point adjacent said pivot and projecting laterally from the lever, means for adjusting the point of attachment of said link to said lever toward and away from said pivot, means provided at the other end of said link for operatively connecting the same to said tie-rod whereby said lever may be oscillated on said pivot by translatory movement of the tie-rod, a pair of screw-threaded blocks provided on the respective arms of said lever, a pair of screws adjustably engaging said blocks, a pulley secured to said shaft, and a flexible cable having its ends anchored to the respective screws, the intermediate portion of said cable passing around and operatively engaging said pulley whereby said lamp unit may be swung in a horizontal plane by the oscillatory movement of said lever.

6. The device as defined in claim 5 together with means for adjusting the length of said link.

References Cited in the file of this patent

UNITED STATES PATENTS

| | | |
|---|---|---|
| 1,293,065 | Fassbinder | Feb. 4, 1919 |
| 1,419,603 | Beam | June 13, 1922 |
| 1,634,580 | Keck | July 5, 1927 |
| 1,860,034 | Kane | May 24, 1932 |
| 2,853,572 | Breeze | Sept. 23, 1958 |

FOREIGN PATENTS

| | | |
|---|---|---|
| 48,983 | Norway | Feb. 9, 1931 |